(12) United States Patent
Engerer et al.

(10) Patent No.: US 9,903,420 B2
(45) Date of Patent: Feb. 27, 2018

(54) SHIFT COLLAR ASSEMBLY FOR A POWER TRANSFER UNIT

(71) Applicant: GKN Driveline North America, Inc., Auburn Hills, MI (US)

(72) Inventors: Daniel Engerer, West Bloomfield, MI (US); Austin Gerding, Shelby Township, MI (US); Tony Arden, Davisburg, MI (US); Rick Ohsiek, Sterling Heights, MI (US); Samuel Oram, Rochester Hills, MI (US); Joseph Palazzolo, Commerce Township, MI (US)

(73) Assignee: GKN Driveline North America, Inc., Auburn Hills, MI (US)

( * ) Notice: Subject to any disclaimer, the term of this patent is extended or adjusted under 35 U.S.C. 154(b) by 46 days.

(21) Appl. No.: 14/784,049

(22) PCT Filed: Apr. 14, 2014

(86) PCT No.: PCT/US2014/033989
§ 371 (c)(1),
(2) Date: Oct. 13, 2015

(87) PCT Pub. No.: WO2014/172274
PCT Pub. Date: Oct. 23, 2014

(65) Prior Publication Data
US 2016/0061274 A1     Mar. 3, 2016

Related U.S. Application Data

(60) Provisional application No. 61/811,976, filed on Apr. 15, 2013.

(51) Int. Cl.
*F16D 11/14* (2006.01)
*F16D 28/00* (2006.01)
(Continued)

(52) U.S. Cl.
CPC .............. *F16D 11/14* (2013.01); *F16D 28/00* (2013.01); *F16D 2011/002* (2013.01); *F16D 2023/123* (2013.01)

(58) Field of Classification Search
CPC .... F16H 11/14; F16D 28/00; F16D 2011/002; F16D 2023/123
See application file for complete search history.

(56) References Cited

U.S. PATENT DOCUMENTS

| 4,684,000 A | 8/1987 | Brown |
| 4,811,824 A | 3/1989 | Kurihara |

(Continued)

FOREIGN PATENT DOCUMENTS

| CN | 1417498 A | 5/2003 |
| WO | WO2007034208 A1 | 3/2007 |

(Continued)

OTHER PUBLICATIONS

Written Opinion & International Search Report for PCT/US2014/033989 dated Aug. 22, 2014, 9 pages.

(Continued)

*Primary Examiner* — Jacob S. Scott
*Assistant Examiner* — Tinh Dang
(74) *Attorney, Agent, or Firm* — Jennifer M. Brumbaugh; Reising Ethington P.C.

(57) ABSTRACT

In at least some implementations, a disconnect assembly for a power transfer unit includes a cam and a cam follower. The cam is driven for rotation and has a cam surface that is inclined relative to an axis of rotation and a void spaced from the cam surface. The cam follower has a cam engagement surface and is arranged to be engaged by the cam surface so that the cam follower is displaced axially during at least a portion of the rotation of the cam. One or both of the cam and the cam follower includes an interface surface (Continued)

provided at an angle to the axis of rotation to control axial movement of the cam follower during at least a portion of the rotation of the cam when the cam surface is not engaged with the cam engagement surface.

21 Claims, 6 Drawing Sheets

(51) Int. Cl.
*F16D 11/00* (2006.01)
*F16D 23/12* (2006.01)

(56) References Cited

U.S. PATENT DOCUMENTS

| | | | | |
|---|---|---|---|---|
| 5,465,819 A | * | 11/1995 | Weilant | B60K 17/20 |
| | | | | 192/35 |
| 5,597,058 A | * | 1/1997 | Ewer | F16D 11/14 |
| | | | | 180/247 |
| 6,793,055 B2 | | 9/2004 | Kasuya et al. | |
| 9,182,012 B2 | * | 11/2015 | Greiss | B60K 17/344 |
| 2005/0279601 A1 | | 12/2005 | Tuday | |
| 2010/0089685 A1 | | 4/2010 | Quehenberger et al. | |
| 2010/0147644 A1 | | 6/2010 | Grogg et al. | |

FOREIGN PATENT DOCUMENTS

WO  WO2008115963 A1  9/2008
WO  WO2012145580 A1  10/2012

OTHER PUBLICATIONS

EP Extended Search Report for EP Application No. 14785092.9 dated Nov. 11, 2016 (7 pages).
CN Office Action for CN Application No. 201480034137.7 dated Feb. 4, 2017 (10 pages).
CN Office Action for CN Application No. 201480034137.7 dated Aug. 14, 2017 (20 pages).

* cited by examiner

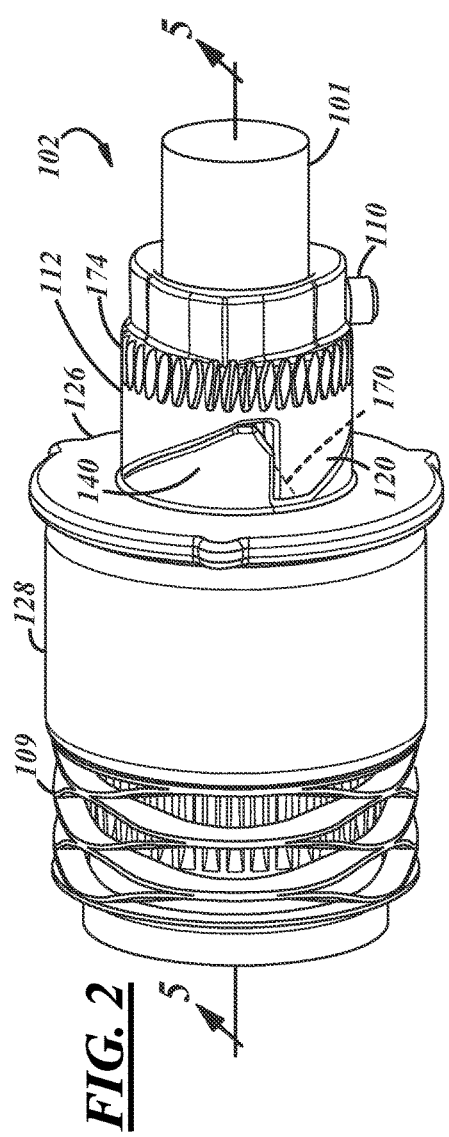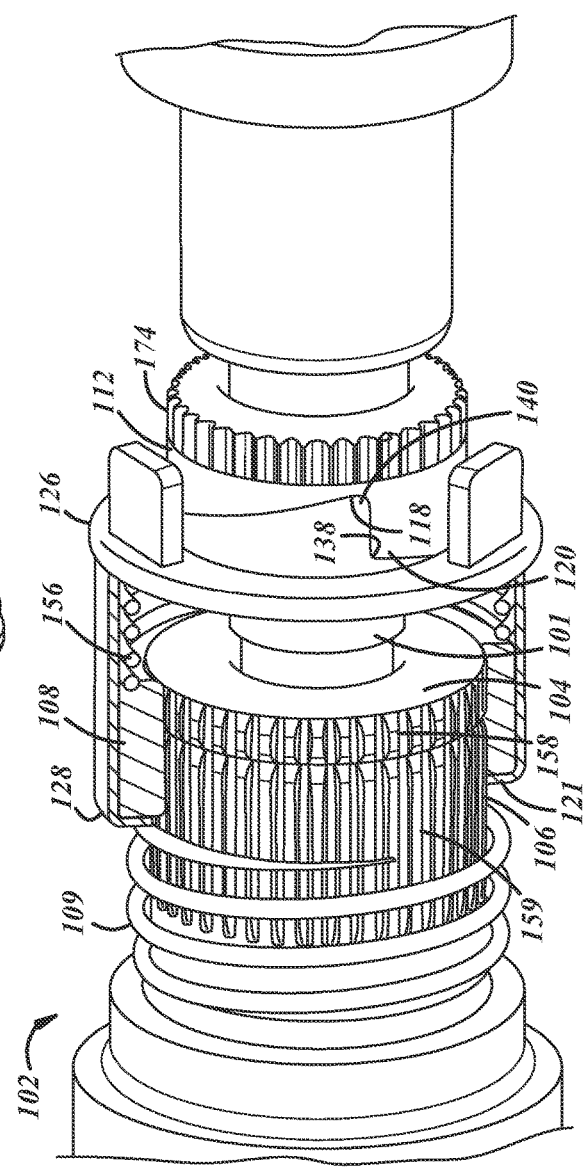

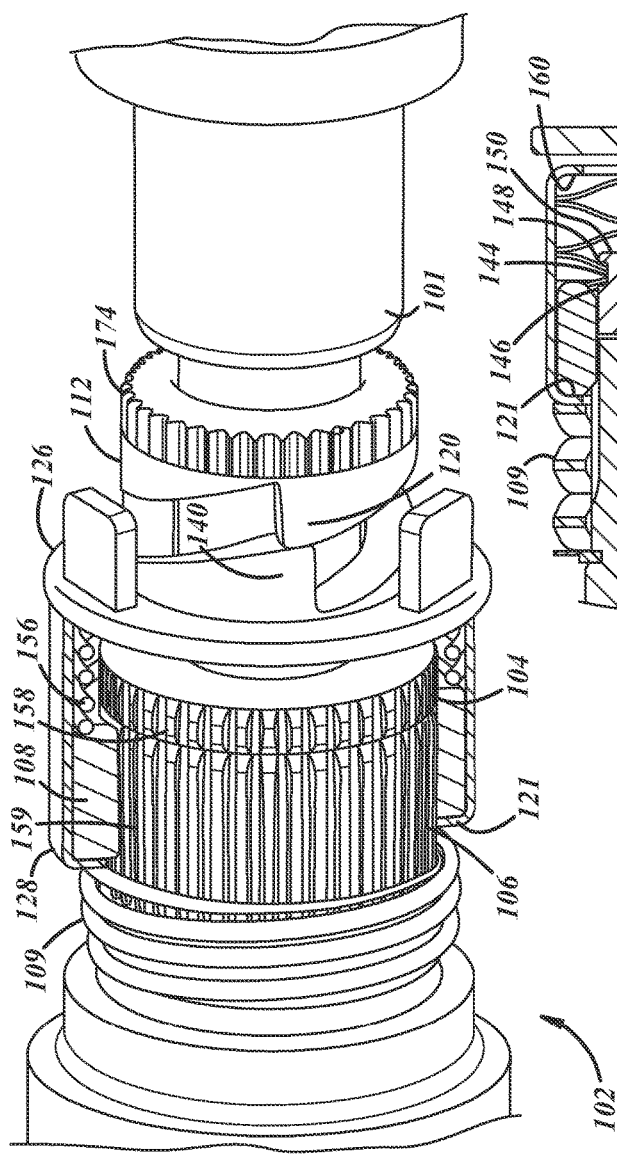

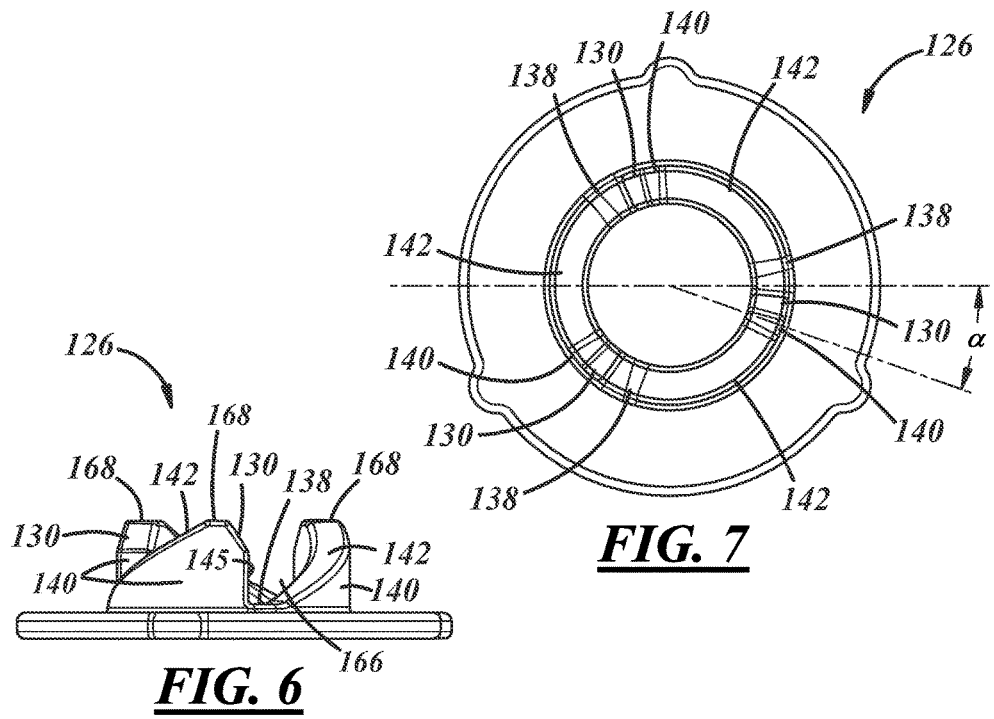
FIG. 7
FIG. 6
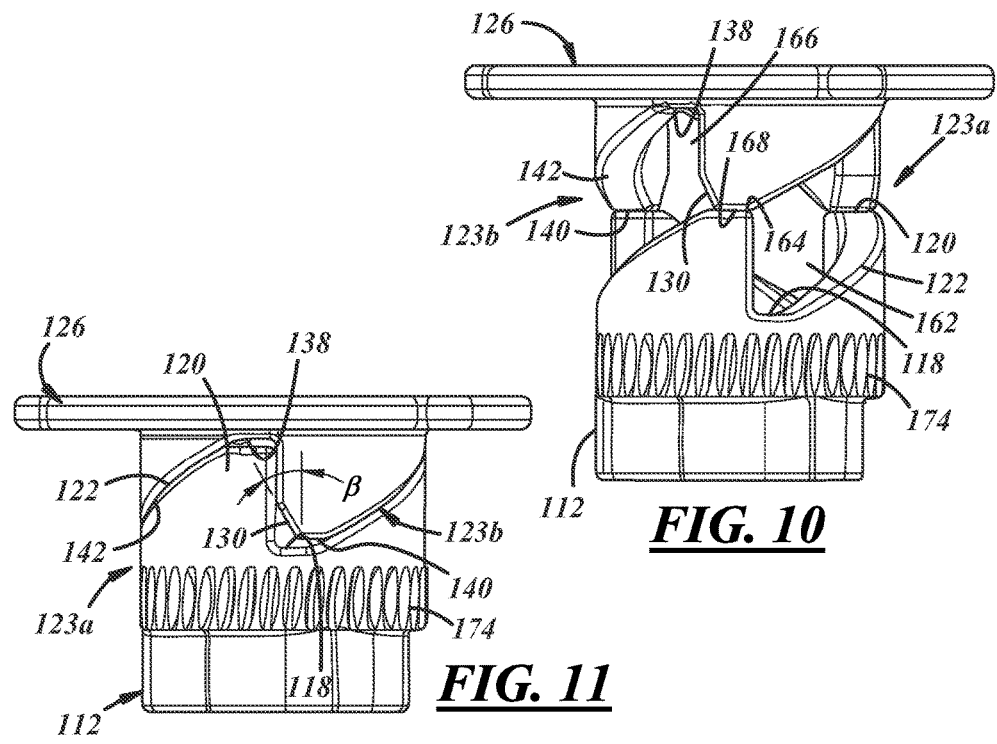
FIG. 10
FIG. 11

SHIFT COLLAR ASSEMBLY FOR A POWER TRANSFER UNIT

REFERENCE TO RELATED APPLICATIONS

This application claims the benefit of U.S. Provisional Application Ser. No. 61/811,976 filed on Apr. 15, 2013, the entire contents of which are incorporated herein by reference.

TECHNICAL FIELD

The present disclosure relates generally to power transfer units, and more specifically to a power transfer unit having a disconnect mechanism for disengaging and re-engaging rotating components.

BACKGROUND

Power transfer units are commonly utilized in front-wheel drive based all-wheel drive systems. Power transfer units may include a disconnect device so that power is transferred to only the front wheels during certain vehicle operating conditions. The disconnect device uncouples the linkage and shafts between the power transfer unit and the rear wheels of the vehicle when the rear wheels need not be actively driven. The disconnect device includes a shift collar that couples aligned portions of co-linear shafts and a cam device coupled to the shift collar to move the shift collar between engaged and disengaged positions. In the engaged position, the shift collar couples the shafts for co-rotation and in the disengaged position, the shafts are not coupled and may rotate independently of one another. Coupling and decoupling rotating shafts presents many challenges including, but not limited to, noise, vibration and harsh tactile feedback generated in the system.

SUMMARY

In at least some implementations, a disconnect assembly for a power transfer unit includes a cam and a cam follower. The cam is selectively driven for rotation about an axis and has a cam surface that is inclined relative to the axis of rotation and a void circumferentially spaced from the cam surface. The cam follower has a cam engagement surface and is arranged to be engaged by the cam surface so that the cam follower is displaced axially during at least a portion of the rotation of the cam. One or both of the cam and the cam follower includes an interface surface provided at an angle to the axis of rotation to control axial movement of the cam follower during at least a portion of the rotation of the cam when the cam surface is not engaged with the cam engagement surface.

A disconnect assembly for a power transfer unit may include an input shaft rotated about an axis, a disconnect shaft axially aligned with the input shaft, a collar and a shock absorbing device. The collar is movable relative to the input shaft and disconnect shaft from an engaged position wherein the collar couples together the input shaft and the disconnect shaft so that rotation of the input shaft causes rotation of the disconnect shaft and a disengaged position wherein the collar does not couple the input shaft and disconnect shaft and the disconnect shaft does not rotate with the input shaft. The shock absorbing device is carried by the input shaft to engage the collar when the collar is in its engaged position. The shock absorbing device may limit travel of the collar toward and into its engaged position and also damp or lessen impact forces compared to an assembly wherein the collar engages a fixed stop surface.

Further, a disconnect assembly for a power transfer unit may include an input shaft rotated about an axis, a disconnect shaft axially aligned with the input shaft, a collar, a cam and a cam follower. The collar is movable relative to the input shaft and disconnect shaft from an engaged position wherein the collar couples together the input shaft and the disconnect shaft so that rotation of the input shaft causes rotation of the disconnect shaft and a disengaged position wherein the collar does not couple the input shaft and disconnect shaft and the disconnect shaft does not rotate with the input shaft. The cam is selectively driven for rotation about an axis and has a plurality of land members and a void on either side of each land member, wherein each land member includes a cam surface that is inclined relative to the axis of rotation. The cam follower has a plurality of land members and a void on either side of each land member of the cam follower, wherein the cam is rotated relative to the cam follower to selectively position the land members of the cam within the voids of the cam follower and to selectively remove the land members of the cam from the voids of the cam follower to axially displace the cam follower away from the cam. An interface surface is carried by one or both of the cam and cam follower to control the axial movement of the cam follower as the land members of the cam are moved into the voids of the cam follower. The collar is operably coupled to the cam follower so that the collar moves axially when the cam follower moves axially to move the collar between the engaged and disengaged positions and wherein the interface surface controls movement of the cam follower that corresponds to movement of the collar at least part of the way from its disengaged to it engaged position.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present invention. Further, the embodiments set forth herein are just some possible examples and are not intended to be exhaustive or otherwise limit or restrict the claims to the precise forms and configurations shown in the drawings and disclosed in the following detailed description.

FIG. 2 is a perspective view of the shift collar assembly of FIG. 1, illustrating the shift collar assembly moved to an engaged position;

FIG. 3 is a perspective partially cutaway view of the shift collar assembly of FIG. 1, illustrating the shift collar assembly in an engaged position;

FIG. 4 is a perspective partially cutaway view of the shift collar assembly of FIG. 1, illustrating the shift collar assembly in a disengaged position;

FIG. 5 is a cross-sectional view of the shift collar assembly of FIG. 2, as taken along line 5-5;

FIG. 6 is a side view of a linear cam follower of the shift collar assembly of FIG. 1;

FIG. 7 is an end view of the linear cam follower of FIG. 6;

FIGS. 10 and 11 are side views of the linear cam follower and the rotary cam of FIGS. 8 and 9, illustrating the shift collar assembly moved to disengaged and engaged configurations, respectively;

DETAILED DESCRIPTION

Figure 1:
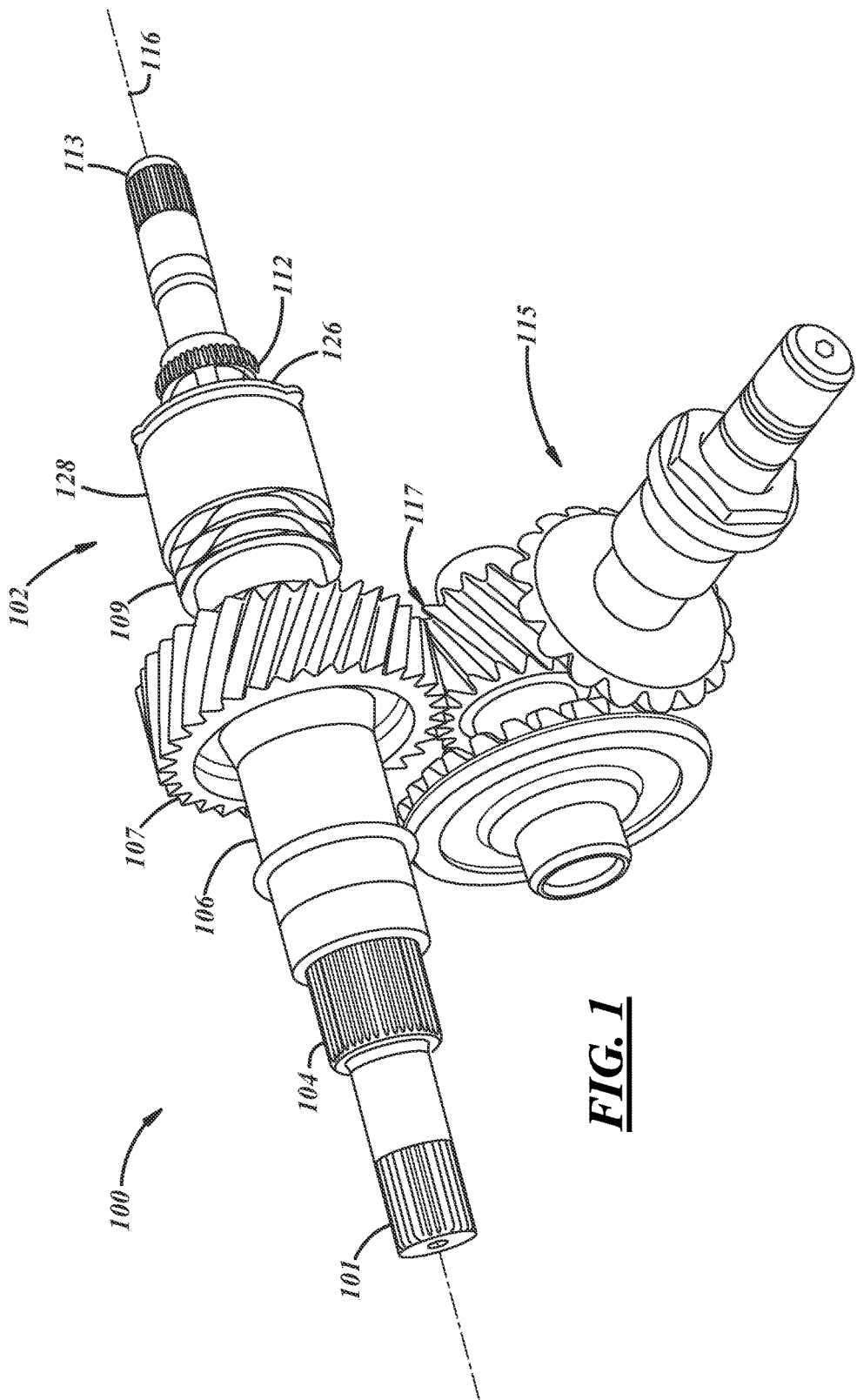
FIG. 1 is a perspective view of a power transfer unit having a shift collar assembly.

Referring in more detail to the drawings, FIG. 1 shows a power transfer unit assembly 100 (PTU). The PTU 100 may include an intermediate driveshaft 101 that is driven for rotation about an axis 116 and mounted within an input shaft 104, and an input disconnect shaft 106 that is mounted on the input shaft 104. The input shaft 104 and input disconnect shaft 106 are selectively coupled together by a shift collar assembly 102. When the shafts 104, 106 are coupled together by the shift collar assembly 102, the input disconnect shaft 106 is driven for rotation by and with the input shaft 104. However, when the shafts 104, 106 are not coupled together the input disconnect shaft 106 is not driven by the input shaft 104 and the input shaft rotates relative to the input disconnect shaft 106.

The input disconnect shaft 106 carries a first gear member 107 that is coupled to an output shaft assembly 115 via a gear connection 117 including one or more gears. Therefore, when the input disconnect shaft 106 is coupled to the input shaft 104, the output shaft assembly is driven for rotation via input disconnect shaft 106 and the gear connection 117. And when the input disconnect shaft 106 is not coupled to the input shaft 104, the output shaft assembly is not driven for rotation. In at least some implementations, the output shaft assembly 115 is used to provide power to the rear wheels of a vehicle and only needs to be driven when it is desired to directly power the rear wheels. Selectively coupling the disconnect shaft 106 with the input shaft 104 permits selectively driving the output shaft assembly 115 and avoids wasting energy in driving the output shaft assembly 115 when it is not needed.

To accomplish the selective driving of the output shaft assembly 115, the shift collar assembly 102 may be movably mounted to the input disconnect shaft 106 to selectively couple the input disconnect shaft 106 with the input shaft 104. Referring now to FIGS. 2 through 5, the shift collar assembly 102 may include a splined collar 108 and a spring 156, both of which may be positioned within a collar housing 128. The splines of collar 108 face and are adapted to mate with the splines 158 on an adjacent portion of the input shaft 104 and splines 159 on an adjacent portion of the input disconnect shaft 106. The collar 108 may be mounted for selective slidable movement relative to the input disconnect shaft 106 and input shaft 104 and of a size to overlap only one of the shafts 104, 106 in the disengaged position, or both shafts 104, 106 in the engaged position. The spring 156 may be mounted between an end face of the collar 108 and an internal surface 160 of the collar housing 128 and may act against the collar 108 to keep the collar 108 adjacent an opposite internal surface 121 of the collar housing 128.

In addition, a biasing spring 109 may be carried by the input disconnect shaft 106 and imparts a biasing force against the collar housing 128 (FIGS. 2 through 5) that tends to move the collar housing 128 toward a first end 113 of the intermediate driveshaft 101 (i.e., toward the right side of the page of FIG. 1). The springs 109, 156 are shown in various figures as wave springs or coil springs; any suitable spring or other biasing member may be used, as desired.

As best shown in FIGS. 2 through 5, the PTU 100 may also have a linearly movable cam follower 126 that may be mounted against the collar housing 128 on a side opposite to the side of the collar housing 128 on which the biasing spring 109 is positioned. A rotary cam 112 may be mounted over the intermediate driveshaft 101 and adjacent to the cam follower 126 for engagement with and actuation of the cam follower 126.

As best shown in FIGS. 2-5 and 8-11, the cam follower 126 may be mounted on or carried by the intermediate driveshaft 101 so that the cam follower 126 does not rotate with the driveshaft 101 and can move axially relative to the driveshaft 101 (e.g. by bearings or bearing surfaces). The rotary cam 112 may also be mounted on or carried by the intermediate driveshaft 101 (e.g. by bearings or bearing surfaces) so that the rotary cam does not rotate with the driveshaft 101, but may rotate relative to the driveshaft 101. In the implementations shown, the cam 112 and cam follower 126 are generally cylindrical and hollow, with the driveshaft 101 extending through them and rotating relative to them.

As shown in at least FIGS. 10 and 11, the rotary cam 112 may be configured with a stepped end face profile 123a defined at least in part by at least one land member 120 (e.g. a cam lobe) and at least one void 162 adjacent to each land member 120. In the implementation shown, the cam 112 includes multiple land members 120 and multiple voids 162 with one void between each land member. Each land member 120 includes an axially inclined and circumferentially oriented ramp or cam surface 122 extending from a valley 118 (e.g. bottom of a void 162) to an axially outer end 164 of the land member 120 along one circumferential direction of the rotary cam 112 (e.g. the direction of rotation of the cam 112). The voids 162 are defined in part by the cam surface and/or may include any portion of the cam 112 that is of lesser axial dimension that the portion of the cam at the outer end 164. The cam follower 126 may have a complementary end face profile 123b defined at least in part by at least one land member 140 and at least one void 166 adjacent to the land member. In the implementation shown, the cam follower 126 includes multiple land members 140 and multiple voids 166 with one void 166 between each land member 140. Each land member 140 includes an axially inclined cam engagement surface 142 extending from a valley 138 (e.g. bottom of a void 166) to an axially outer end 168 of the land member 140 along one circumferential direction of the rotary cam 112. The cam engagement surfaces 142 are arranged to be engaged by the cam surfaces 122 during at least a portion of the rotation of the cam 112.

The end face profile 123a of the cam 112 cooperates with the end face profile 123b of the cam follower 126 so that at least a portion of the rotation of the cam 112 drives the cam follower 126 in a desired manner. In the implementation shown, as the cam 112 rotates, its land members 120 are alternately received within and removed from the voids 166 of the cam follower 126 and during this movement, the cam follower 126 is moved axially toward and away from the cam 112. As shown in FIGS. 2, 3, 5, 9 and 11, when the land members 120 of the cam 112 are aligned with the valleys 138 of the cam follower 126, the land members 120 are received within the voids 166 under the force of the spring 109 which urges the collar housing 128 into the cam follower 126 and, in turn, the cam follower 126 toward the cam 112. Likewise, the land members 140 of the cam follower 126 are received within the voids 162 of the cam 112. With the cam 112 and cam follower 126 meshed in this way, the cam follower 126 is axially positioned as close to the cam 112 as it can get and the collar housing 128 is axially positioned along the driveshaft 101 to permit the collar 108 to overlap and mesh with both the input disconnect shaft 106 and the input shaft 104. Hence, in this engaged position, the collar 108 couples together the shafts 104 and 106 so that the shafts rotate together as the driveshaft 101 is rotated. As noted above, rotation of the input disconnect shaft 106 drives the output shaft assembly 115 via the gear connection 117.

Figure 8:
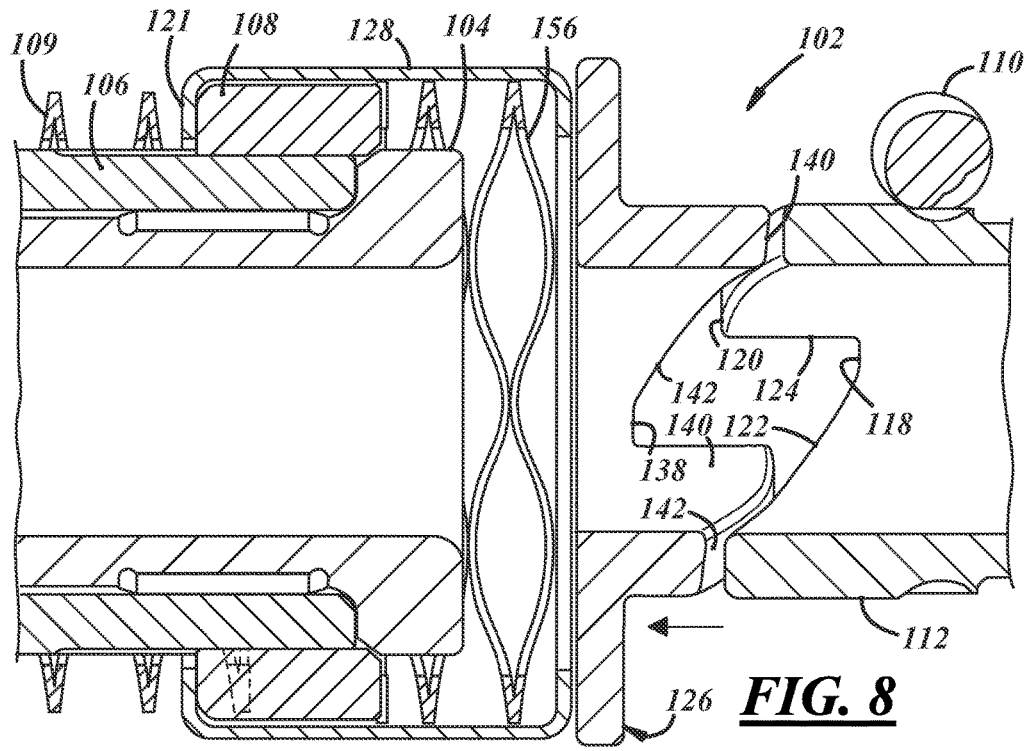
FIGS. 8 and 9 are cross-sectional views of another embodiment of the shift collar assembly of FIG. 1, illustrating the shift collar assembly moved to disengaged and engaged configurations, respectively.
Figure 9:
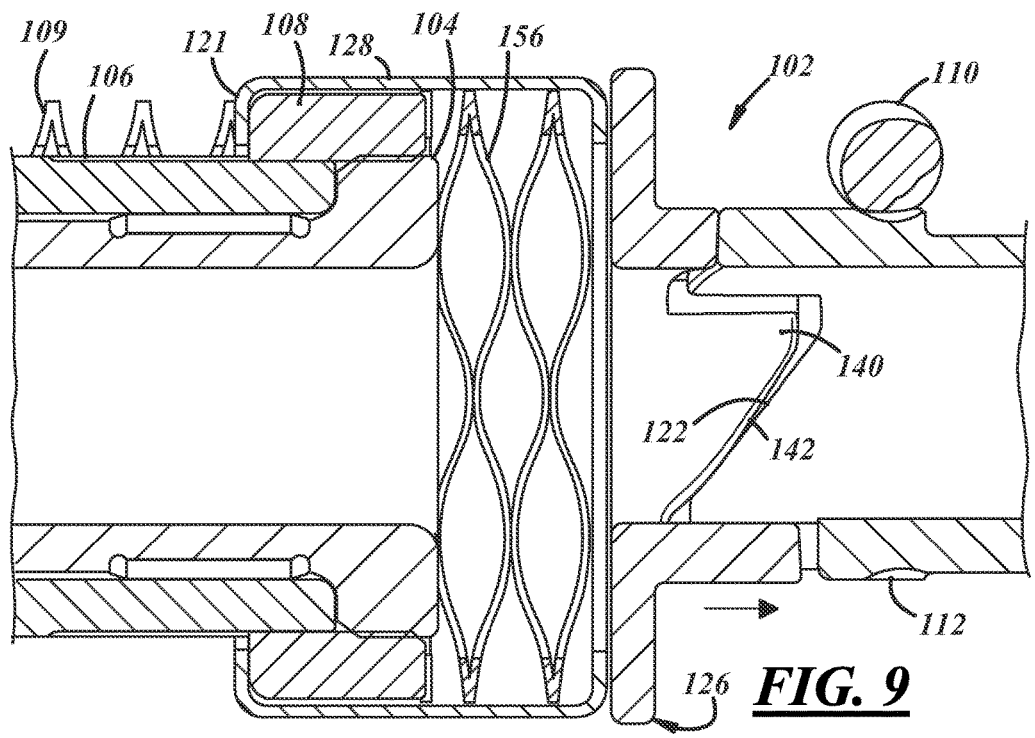

To move from the engaged position of the collar to the disengaged position, the cam 112 is rotated relative to the cam follower 126 and the cam surfaces 122 of land members 120 engage the follower's cam engagement surfaces 142 to drive the cam follower 126 axially away from the cam 112. As shown in FIGS. 4, 8 and 10, when the land members 120 of the cam 112 are rotated out of alignment with the voids 166 of the cam follower 126, ends 164 of the land members 120 are aligned and engaged with ends 168 of the land members 140. In this position, the cam follower 126 is displaced a maximum axial distance from the cam 112 and the cam follower 126 in turn displaces the collar housing 128 away from the cam 112 against the force of the spring 109. In this position, the collar 108 overlaps and is meshed only with the input disconnect shaft 106 and the collar is not meshed with the input shaft 104. Hence, rotation of the input shaft 104 does not rotate the input disconnect shaft 106. Because the input disconnect shaft 106 is not driven for rotation, the first gear 107 is not rotated and the output shaft assembly 115 also is not rotated.

In this example, a side of each land member 120 opposite to the cam surface 122 may be immediately adjacent to a valley 118. A surface 124 may be aligned with the axis 116 of the shaft 101 and may extend between a land member 120 and an adjacent valley 118 and provide an immediate transition from the axially outer end 164 of the land member 120 to the valley 118 in the circumferential direction. Of course, the surface 124 need not be aligned with the axis 116 and could be inclined from the axis to control the rate of axial movement of the cam follower 126 toward the cam 112 as the outer ends 164, 168 are rotated out of alignment with each other. The slope of the cam surfaces 122 relative to the axis 116 controls the rate at which the collar 108 is disengaged from the input shaft 104, and the slope of the surface 124 relative to the axis 116 likewise controls the rate at which the collar 108 is engaged with the input shaft 104. This is because the collar 108 moves axially with the collar housing 128 (via the spring 156) and the collar housing 128 moves axially with the cam follower 126 (via the spring 109). So the collar 108 may be considered to be coupled to the cam follower 126 by at least one spring that yieldably biases the collar 108 so that the collar 108 is responsive to axial movement of the cam follower 126. And in at least some implementations, the rate of axial movement of the cam follower 126 correlates to the rate of axial movement of the collar 108.

Furthermore, the cam follower 126 may also have a plurality of interface surfaces 130 inclined relative to the axis and extending from the outer ends 168 of the land members 140 toward the valleys 138 relative to the direction of rotation of the cam 112. The interface surfaces 130 control the rate of axial movement of the cam follower 126 relative to the cam 112 as the cam land members 120 are rotated into alignment with the cam follower voids 166. The interface surfaces 130 may provide intermediate portions that extend from the ends 168 to the valleys 138 along one circumferential direction and are not be aligned with the axis 116, to control the rate of axial movement of the shift collar 108 toward its engaged position and reduce noise associated with the speed at which splines of the shift collar 108 re-engage with splines of the input shaft 104. In this respect, the interface surfaces may permit the shafts 104, 106 to re-engage with one another at a speed that is slower than the generally instantaneous speed that would be associated with a straight axial transition from an end 168 directly to a valley 142.

These interface surfaces 130 may have any suitable length and may be slanted at any angle with respect to the axis 116, so as to further control the speed by which the shift collar 108 moves from the disengaged position to the engaged position. In addition or instead, similar interface surfaces may be formed in the rotary cam between the ends 164 and valleys opposite to the cam surfaces, as shown by the dashed line 170 in FIG. 2 which shows an alternate surface configuration of the cam 112. In at least some implementations, the interface surface(s) may be oriented at an acute included angle β (FIG. 11) relative to the axis 116, where β is between 5 degrees and 50 degrees, although other angles may be used. Further, the interface surface(s) 130 may extend circumferentially over an angle α (FIG. 7) of between about 10 degrees and 180 degrees, although other angles may be used including smaller angles and up to 360 degrees. The interface surface 130 may be provided at a steeper angle than the cam surface 122 so that greater axial movement of the cam follower 126 occurs for a given amount of cam rotation when the interface surface 130 is engaged by the cam 112 than when the cam surface 122 is displacing the cam follower 126. As best shown in FIG. 6, the surface 145 may include an axially oriented portion extending between the interface surface 130 and the valley 138, if desired.

Figure 14:
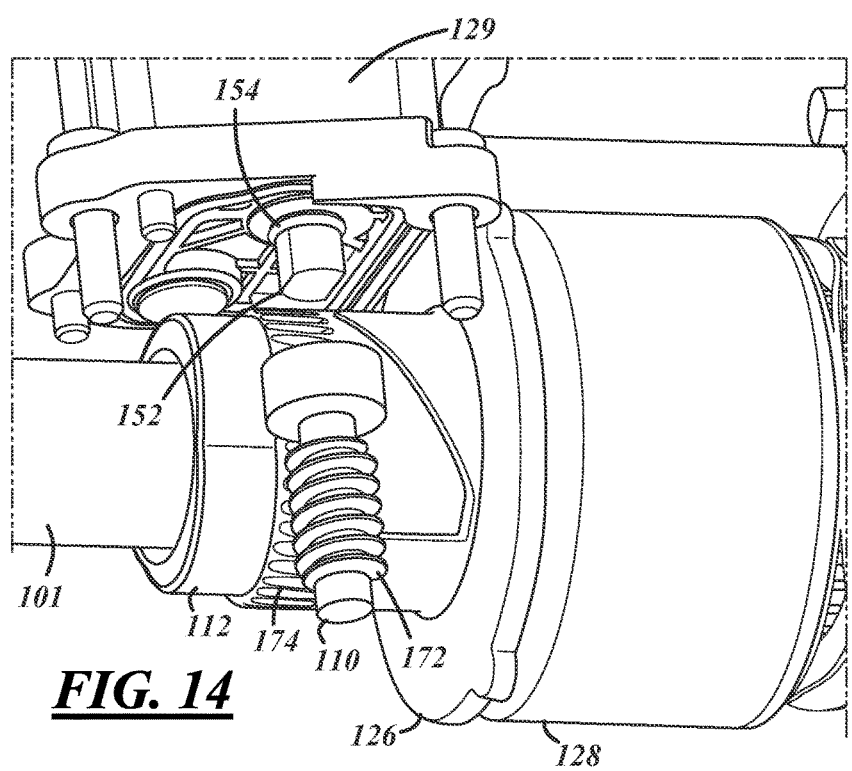
FIG. 14 is a partially exploded view of the shift collar assembly of FIG. 1, illustrating the shift collar assembly having a worm gear and a shaft that drives the worm gear and has a damper.

To selectively couple the input disconnect shaft 106 to the input shaft 104, and selectively decouple the input disconnect shaft 106 from the input shaft 104, an actuator assembly 129 (FIG. 14) may selectively rotate the rotary cam 112 relative to the cam follower 126. In one implementation, as shown in FIG. 14, the actuator 129 includes an electric motor that rotates an output shaft 152. The output shaft 152 is coupled to a gear, shown as a worm gear 110, to rotate the worm gear. The worm gear 110 includes teeth 172 that are meshed with teeth 174 carried by the cam 112 so that rotation of the worm gear 110 causes rotation of the cam 112 relative to the driveshaft 101 and the cam follower 126. The output shaft 152 may be at least partially received within the worm gear 110 and may include or carry a damper 154 that interfaces with the worm gear and reduces the noise generated by engagement of the output shaft 152 with the worm gear 110 or by vibrations propagated by or between these components. The damper 154 may be an annular, elastomeric member received around the output shaft, such as an O-ring or similar component.

Figure 12:
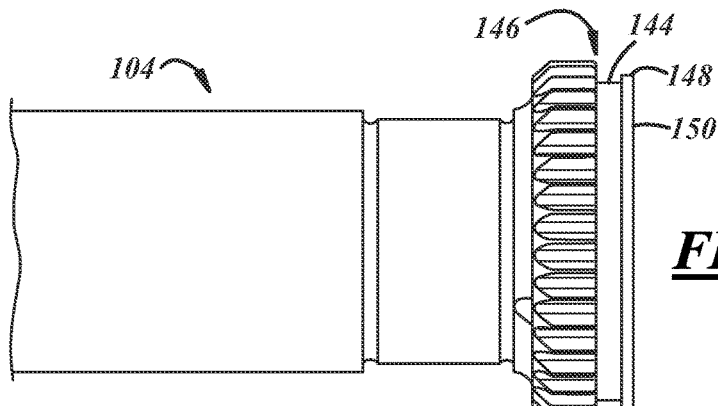
FIG. 12 is a side view of the input shaft of the shift collar assembly of FIG. 1, illustrating the shaft having a seat for receiving a shock absorbing apparatus.
Figure 13:
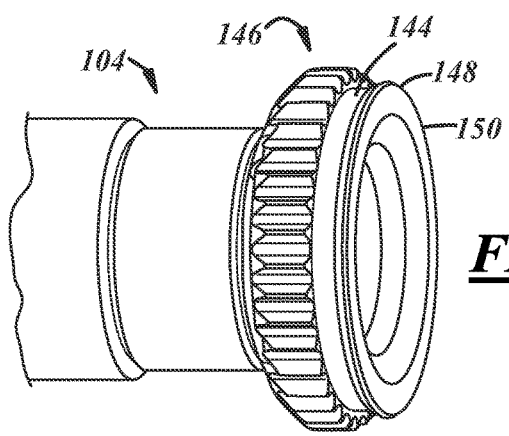
FIG. 13 is a perspective view of the input shaft of FIG. 12.

As best shown in FIG. 5, the shift collar assembly 102 may further include a shock absorbing apparatus 132 carried by an end portion of the input shaft 104 to, for example, be engaged by the collar 108 to limit axial movement of the collar 108 and/or reduce noise and vibrations propagated by or between the collar 108 and input shaft 104. This may reduce noise associated with the shift collar 108 moving from the disengaged position to the engaged position as compared to a device wherein the shift collar contacts a rigid stop surface. The shock absorbing apparatus 132 may be any resilient member, such as a spring washer, which in one form may be a single turn wave washer. However, the shock absorbing apparatus may instead be a multiple turn wave washer, a conical Belleville washer, bowed washer, curved washer, finger washer, adjustable spacer, other resilient members or dampers or any combination thereof. In the implementation shown, the spring washer 132 is received within a channel 144 formed in an end portion 146 of the input shaft 104, axially outboard of the splines (FIGS. 12 and 13). In addition, the spring washer 132 may be further supported by a stop surface, such as a flange 148 extending radially from an end 150 of the input shaft 104 and axially spaced from the splines 158, such that the flange 148 supports or backs-up one side the spring washer 132 and permits the spring washer 132 to be compressed between the shift collar 108 and the flange 148 for somewhat gradually slowing the shift collar to a stop in the engaged position. The channel 144 and shock absorbing apparatus 132 are not shown in all figures, for example FIGS. 3, 4, 8 and 9, although these features could be added to the implementations shown in all figures, if desired.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

All terms used in the claims are intended to be given their broadest reasonable constructions and their ordinary meanings as understood by those skilled in the art unless an explicit indication to the contrary in made herein. In particular, use of the singular articles such as "a," "the," "the," etc. should be read to recite one or more of the indicated elements unless a claim recites an explicit limitation to the contrary.

What is claimed is:

1. A disconnect assembly for a power transfer unit, comprising:
   an input shaft rotated about an axis and having an end portion with a flange;
   a disconnect shaft axially aligned with the input shaft;
   a collar movable relative to the input shaft and disconnect shaft from an engaged position wherein the collar couples together the input shaft and the disconnect shaft so that rotation of the input shaft causes rotation of the disconnect shaft and a disengaged position wherein the collar does not couple the input shaft and disconnect shaft and the disconnect shaft does not rotate with the input shaft; and
   a shock absorbing device carried by the input shaft to engage the collar when the collar is in its engaged position, wherein the flange supports the shock absorbing device and permits the shock absorbing device to be compressed between the collar and the flange.

2. The assembly of claim 1, wherein the shock absorbing device is a spring washer, a single turn wave washer, a multiple turn wave washer, a conical Belleville washer, a bowed washer, a curved washer, a finger washer, an adjustable spacer, a resilient member or a damper.

3. The assembly of claim 1, wherein the input shaft includes a splined portion and the shock absorbing device is located between the splined portion and the flange.

4. The assembly of claim 1, wherein the shock absorbing device is carried by the input shaft at the end portion of the input shaft.

5. The assembly of claim 1 which also comprises a collar housing, a spring acting on the collar and the collar housing, wherein the spring is separate from the shock absorbing device.

6. The assembly of claim 5 which also comprises a biasing spring acting on the disconnect shaft and the collar housing.

7. The assembly of claim 1 wherein the shock absorbing device is received within a channel formed in the end portion of the input shaft.

8. The assembly of claim 1 which also includes:
   a cam selectively driven for rotation about an axis and having a cam surface that is inclined relative to the axis of rotation and a void circumferentially spaced from the cam surface, and
   a cam follower having a cam engagement surface arranged to be engaged by the cam surface during at least a portion of the rotation of the cam so that the cam follower is displaced axially during at least a portion of the rotation of the cam, and wherein one or both of the cam and the cam follower includes an interface surface provided at an angle to the axis of rotation to control axial movement of the cam follower during at least a portion of the rotation of the cam when the cam surface is not engaged with the cam engagement surface, wherein the collar is operably coupled to the cam follower so that the collar moves axially when the cam follower moves axially to move the collar between the engaged and disengaged positions.

9. The assembly of claim 8 wherein the cam includes multiple land members each defining an end surface, and a void on each side of each land member, each land member includes a cam surface leading to the end surface of the land member and adapted to displace the cam follower axially away from the cam, and each land member also includes said interface surface leading from the end surface to an adjacent void in the direction of rotation of the cam.

10. The assembly of claim 8 wherein the cam follower includes multiple land members each defining an end surface, and a void on each side of each land member, each land member includes a cam engagement surface leading to the end surface of the land member and adapted to be engaged and displaced by the cam surface during rotation of the cam, and each land member also includes said interface surface leading to an adjacent void in the direction of rotation of the cam.

11. The assembly of claim 10 wherein during rotation of the cam, the cam surface of the cam engages the cam engagement surface of one land member of the cam follower to axially displace the cam follower in a direction away from the cam and movement of the land member of the cam follower towards the void of the cam engages the cam with an adjacent interface surface of the cam follower to control axial movement of the cam follower in a direction toward the cam.

12. The assembly of claim 8 wherein the interface surface is provided at a steeper angle than the cam surface so that greater axial movement of the cam follower occurs for a given amount of cam rotation when the interface surface is engaged by the cam than when the cam surface is displacing the cam follower.

13. The assembly of claim 8 wherein the cam includes a plurality of land members and a void on either side of each land member and the cam follower includes a plurality of land members and a void on either side of each land member of the cam follower, wherein the cam is rotated relative to the cam follower to selectively position the land members of the cam within the voids of the cam follower and further rotation of the cam removes the land members of the cam from the voids of the cam follower to axially displace the cam follower away from the cam, and wherein the interface surface controls the axial movement of the cam follower as the land members of the cam are moved into the voids of the cam follower.

14. The assembly of claim 8 which also comprises a collar operably coupled to the cam follower and movably axially as the cam follower moves axially, the collar arranged to selectively couple together and decouple two shafts as the collar is moved axially.

15. The assembly of claim 14 wherein the collar is coupled to the cam follower by at least one spring that yieldably biases the collar so that the collar is responsive to axial movement of the cam follower.

16. The assembly of claim 8 which also comprises a worm gear coupled to the cam to selectively rotate the cam, a shaft coupled to the worm gear and driving the worm gear for rotation and a damper engaged by the worm gear and the shaft to limit direct contact between the shaft and worm gear.

17. A disconnect assembly for a power transfer unit, comprising:
an input shaft rotated about an axis and having a channel formed in the input shaft;
a disconnect shaft axially aligned with the input shaft;
a collar movable relative to the input shaft and disconnect shaft from an engaged position wherein the collar couples together the input shaft and the disconnect shaft so that rotation of the input shaft causes rotation of the disconnect shaft and a disengaged position wherein the collar does not couple the input shaft and disconnect shaft and the disconnect shaft does not rotate with the input shaft; and
a shock absorbing device received within the channel and arranged so that when the collar is in its engaged position the shock absorbing device is compressed between the collar and a portion of the input shaft.

18. The assembly of claim 17 wherein the input shaft includes a flange adjacent to the channel and, when the collar is in the engaged position, the shock absorbing device is compressed against the flange.

19. A disconnect assembly for a power transfer unit, comprising:
an input shaft rotated about an axis;
a disconnect shaft axially aligned with the input shaft;
a collar movable relative to the input shaft and disconnect shaft from an engaged position wherein the collar couples together the input shaft and the disconnect shaft so that rotation of the input shaft causes rotation of the disconnect shaft and a disengaged position wherein the collar does not couple the input shaft and disconnect shaft and the disconnect shaft does not rotate with the input shaft; and
an annular shock absorbing device received around the input shaft and having an inner diameter smaller than an outer diameter of a portion of the input shaft so that the shock absorbing device is carried by the input shaft and the shock absorbing device is arranged so that when the collar is in its engaged position the shock absorbing device is compressed between the collar and a portion of the input shaft.

20. The assembly of claim 19 wherein the input shaft includes a channel having an outer diameter less than the inner diameter of the shock absorbing device and wherein a portion of the input shaft not including the channel has an outer diameter that is greater than the inner diameter of the shock absorbing device.

21. The assembly of claim 19 wherein the input shaft includes a flange having an outer diameter greater than the inner diameter of the shock absorbing device and wherein the shock absorbing device is engageable with the flange.

* * * * *